United States Patent [19]

Bennett et al.

[11] 4,023,676
[45] May 17, 1977

[54] LANCE STRUCTURE AND METHOD FOR OXYGEN REFINING OF MOLTEN METAL

[75] Inventors: Howard W. Bennett, Houston; Orand L. Lambert, Conroe, both of Tex.

[73] Assignee: Armco Steel Corporation, Middletown, Ohio

[22] Filed: Sept. 20, 1976

[21] Appl. No.: 725,028

[52] U.S. Cl. ............................. 266/222; 266/268; 266/47

[51] Int. Cl.² ......................................... C21C 5/48

[58] Field of Search ............... 75/60; 266/220–222, 266/224, 47, 265–270; 122/6.6; 110/182.5

[56] References Cited

UNITED STATES PATENTS

| 3,829,073 | 8/1974 | Courard | 266/268 |
| 3,844,768 | 10/1974 | Leroy et al. | 75/60 |
| 3,976,238 | 8/1976 | Sartorius | 266/265 |

Primary Examiner—Gerald A. Dost

Attorney, Agent, or Firm—Melville, Strasser, Foster & Hoffman

[57] ABSTRACT

A lance structure for oxygen refining of molten ferrous metal comprising three concentric metallic tubes extending through a side wall of a reaction vessel and terminating in a common discharge plane beneath the molten metal surface adjacent the side wall, the innermost tube conducting an oxygen-containing gas, the annular space between the innermost and second tube conducting a shroud gas, a pair of parallel auxiliary cooling pipes in another annular space between the second tube and the outermost tube for conducting cooling gas, the pipes being on opposite sides of the second tube in the 3 o'clock and 9 o'clock positions, and refractory material encasing the pipes and occupying the other annular space, the pipes being sufficiently remote from the second tube that cooling gas discharged therefrom does not intermingle with the oxygen. A method of oxygen refining molten steel is disclosed utilizing such a lance structure.

12 Claims, 2 Drawing Figures

U.S. Patent
May 17, 1977
4,023,676
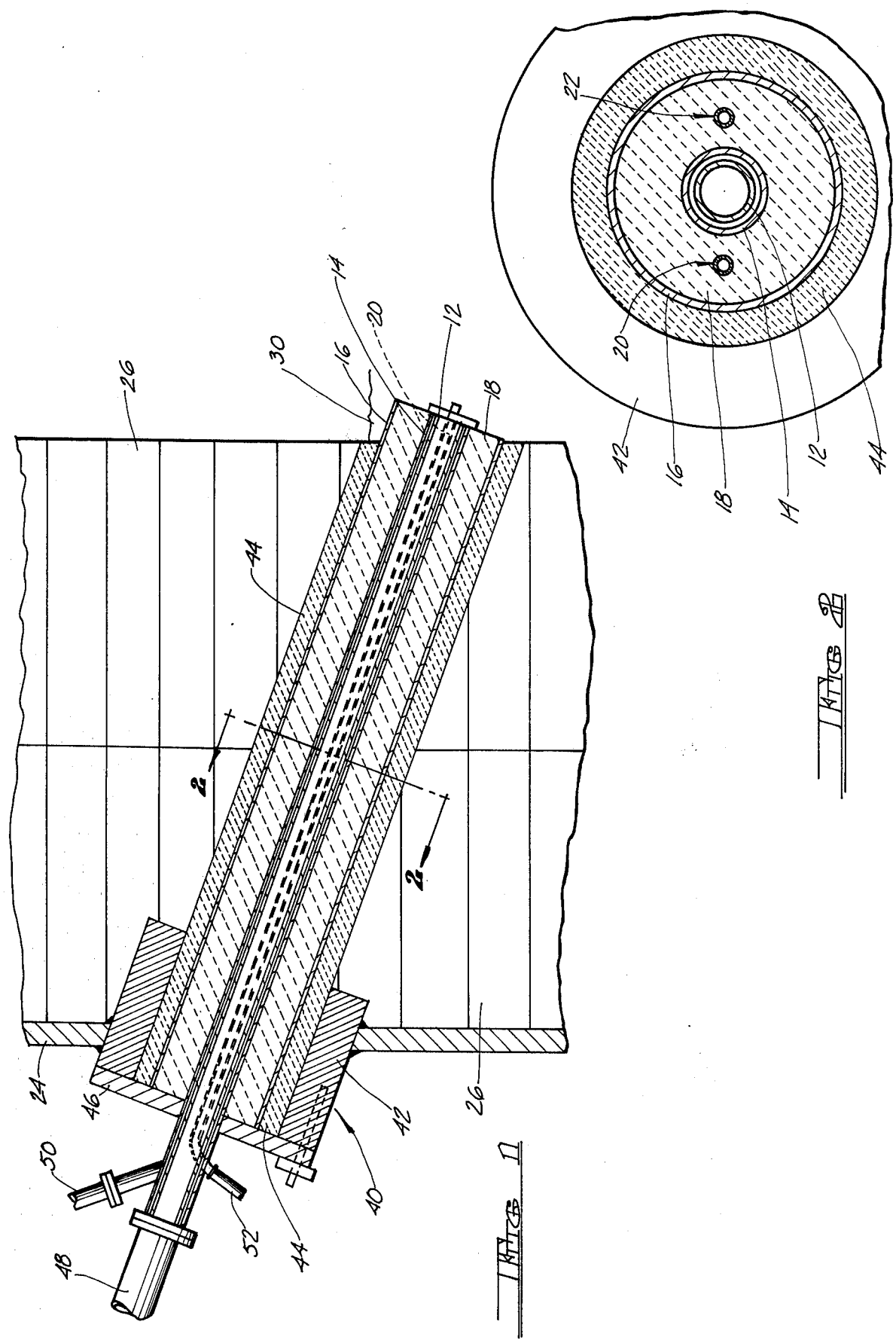

LANCE STRUCTURE AND METHOD FOR OXYGEN REFINING OF MOLTEN METAL

BACKGROUND OF THE INVENTION

1. Field of the Invention

This invention relates to an improved lance construction for supplying pressurized fluids beneath the surface of molten metal in a refractory lined refining vessel, and more particularly as applied to a method for oxygen refining of molten steel wherein a stream of oxygen-bearing gas is introduced beneath the surface of the molten steel in an electric arc furnance or similar refining vessel. A cooling gas, wich may be a combustible hydrocarbon, is introduced simultaneously with the oygen-bearing gas to act as a shield or shroud gas so as to decrease consumption of the submerged end of the lance.

2. Description of the Prior Art

The theoretical advantages of oxygen refining by means of a submerged lance or tuyere have been known for many years. However, attempts to practice this concept on a commercial scale have encountered a number of problems which have prevented full realization in actual practice of the theoretical advantages.

Among the problems inherent in injection of commercially pure oxygen or oxygen-enriched air (hereinafter referred to for convenience as "oxygen-bearing gas") through a submerged lance or tuyere are premature failure of the lance due to infiltration of molten metal and solidification thereof behind the tip of the lance, rapid consumption of the submerged lance tip and severe erosion of the refractory lining of the furnace or other refining vessel adjacent the discharge end of the lance or tuyere. Although the prior art has addressed itself to the solution of some or all of these problems, none of the alleged solutions has been entirely satisfactory to the best of applicants' knowledge.

British Pat. No. 882,676, published in November 1961, disclosed the concept of introducing an oxygen-containing gas below the surface of molten ferrous metal through a lance consisting of an inner steel tube surrounded by a concentric steel tube of greater diameter, with a combustible gas being passed through the annular space between the tubes. A similar disclosure was contained in French Pat. No. 1,450,718 published Aug. 26, 1966, wherein oxygen and a combustible hydrocarbon gas were injected at relatively low pressures. The use of a combustible gas surrounding the oxygen gas stream was found to cool the region adjacent the discharge end of the lance or tuyere and to decrease the reaction rate of the oxygen discharged therefrom. This in turn decreased consumption of the submerged lance tip and erosion of the refractory lining of the refining vessel adjacent the lance tip.

Subsequent to the above disclosures, considerable attention has been devoted to improvements on the basic concept of oxygen refining by means of submerged lances or tuyeres and in improvements in lance construction. Among the many United States Patents in this field, reference may be made U.S. Pat. Nos. 3,330,645; 3,703,279; 3,706,549; 3,722,814; 3,751,019; 3,781,001; 3,794,308; 3,819,165; 3,829,073; 3,851,866; 3,897,048; and 3,951,643.

Patents such as U.S. Pat. Nos. 3,330,645; 3,819,165 and 3,829,073 disclose a coaxial tuyere arrangement wherein oxygen is blown through a center tube, hydrocarbon or other cooling fluid is introduced through an annular porous member or through a plurality of channels of small cross sections.

Patents such as U.S. Pat. Nos. 3,703,279 and 3,706,549 apparently assume that erosion of the refractory lining and consumption of the lance tip cannot be prevented and provide an erodible tuyere comprising coaxial inner and outer tubes of constant cross section (in the case of U.S. Pat. No. 3,703,279) or arrange a relative proportioning of oxygen and hydrocarbon gas flows in such manner that the lance or injector tip (positioned in the bottom of the reaction vessel) is consumed at a rate substantially the same as the refractory lining (in the case of U.S. Pat. No. 3,706,549).

Patents such as U.S. Pat. Nos. 3,751,019 and 3,794,308 provide fluid cooling for the lance tip exposed to molten metal.

U.S. Pat. No. 3,897,048 discloses a tuyere assembly comprising coaxial tubes wherein fuel only may be pumped through an outer annular space, oxygen only may be blown through an inner annular space, and valving is provided in order to blow fuel only, oxygen only, oxygen and fuel, or an inert gas through a central tube.

U.S. Pat. No. 3,951,643 discloses a coaxial tuyere arrangement in an electric arc furnace pivotal between a first position and a second position wherein the angle at which the tuyere projects through the furnace wall can be adjusted when the tuyere is installed.

SUMMARY

It is a principal object of the present invention to provide a lance construction wherein infiltration of molten metal behind the tip of the lance is prevented, and wherein lance consumption and erosion of the refractory lining of the refining vessel are minimized to a greater extent than in prior art structures.

It is a further object of the present invention to provide a method for the oxygen refining of molten steel in a refractory lined refining vessel such as an electric arc furnace, wherein refining time and furnace lining repair time are substantially reduced, wherein the efficiency of carbon oxidation is improved, and wherein the number of heats diverted due to unacceptable composition is drastically reduced.

According to the present invention, a lance structure for supplying fluids under pressure beneath the surface of molten metal in a refractory lined vessel, wherein the refractory lining is subject to erosion as successive heats of refined metal are produced, comprises three concentric tubes extending through a side wall of the vessel and terminating in a common discharge plane beneath the molten metal surface; adjacent the side wall; means for supplying an oxygen-bearing gas to the innermost one of the tubes; an annular space between the innermost tube and the second tube; means for supplying a shroud gas to the annular space; another annular space between the second tube and the outermost tube; a refractory material in the other annular space between the second tube and the outermost tube; a pair of parallel auxiliary cooling pipes encased in the refractory material and terminating in the common discharge plane of the concentric tubes, the pipes being disposed on opposite sides of the second tube and being centered on the horizontal diameter of the three tubes; and means for supplying a cooling gas to the auxiliary pipes, the pipes being positioned a distance sufficiently remote from the second tube that cooling gas supplied to the pipes does not intermix with the oxygen-bearing gas at the discharge end of the lance.

The method of the present invention for oxygen refining of molten steel in a refractory lined refining vessel comprises the steps of introducing a stream of oxygen-bearing gas beneath the surface of a molten steel bath through a lance extending through the refractory lining and having a discharge adjacent the inner surface of the lining, simultaneously introducing a stream of shroud gas through the lance in surrounding relation to the oxygen-bearing gas stream, simultaneously introducing two auxiliary streams of cooling gas on each side of the oxygen-bearing gas stream at a distance sufficiently remote therefrom that the auxiliary gas streams do not surround the oxygen-bearing gas stream but rather bubble upwardly along the inner surface of the refractory lining, thereby minimizing consumption of the lance and erosion of the refractory lining.

The provision of a refractory material in the annular space between the second tube and the outermost tube effectively prevents infiltration of molten metal behind the lance tip.

BRIEF DESCRIPTION OF THE DRAWINGS

Reference is made to the accompanying drawing wherein:

FIG. 1 is a vertical sectional view of apparatus embodying the present invention; and FIG. 2 is a sectional view taken on the line 2—2 of FIG. 1.

DESCRIPTION OF THE PREFERRED EMBODIMENTS

Referring to FIGS. 1 and 2, an exemplary lance construction in accordance with the invention is illustrated. This structure comprises three concentric metallic tubes, the innermost tube being shown at 12, the second or intermediate tube being shown at 14 and the outermost tube being shown at 16. Refractory material, shown at 18, occupies the annular space between the second tube 14 and the outermost tube 16, except for the area occupied by a pair of auxiliary pipes 20 and 22, made of metal or refractory material.

Tube 12 is adapted to conduct oxygen or an oxygen-enriched gas, while the annular space between tubes 12 and 14 is adapted to conduct a shroud gas in surrounding relation to the oxygen-containing gas stream. Pipes 20 and 22 are adapted to conduct auxiliary flows of cooling gas which ordinarily will be the same gas as the shroud gas supplied to the annular space between tubes 12 and 14.

Referring to FIG. 1, the lance structure is positioned in an opening through a reaction vessel, such as an electric arc furnace having a steel side wall 24 and a lining 26 of refractory bricks. The lance is inclined downwardly, and the concentric tubes 12, 14 and 16 and auxiliary pipes 20 and 22 terminate in a common discharge plane beneath the surface of a bath of molten ferrous metal within the reaction vessel indicated at 30. The uppermost edge of the lance structure should project inwardly only several inches beyond the inner surface of lining 26. The opening in the outer surface of side wall 24 is above the surface of the molten metal bath when the reaction vessel is in the level or untilted position.

The refractory material 18, in which the auxiliary cooling pipes 20 and 22 are encased, may be a cast or rammed refractory of aluminum oxide-containing or magnesium oxide-containing material, or a chemically bonded or direct bonded or fused grain refractory.

The concentric tubes 12, 14 and 16, and the auxiliary cooling pipes 20 and 22 may be fabricated from carbon steel, stainless steel, copper, alloys of copper, or refractory material.

Means are provided, indicated generally at 40, for securing the lance structure in the downwardly inclined opening in the side wall and refractory lining of the reaction vessel. A preferred, but not necessarily only, embodiment of such means comprises an open-ended cylindrical cast steel member or insert 42 having an inside diameter greater than the outside diameter of the outermost tube 16 and concentric therewith. The cylindrical member 42 extends outwardly to terminate at its one end outside the side wall 24 and terminates at its other inner end within the refractory lining 26. The cylindrical member 42 is maintained in concentric relation to the tube 16 by means of rammed refractory material 44 in the annular space between the member 42 and the tube 16. The refractory material 44 is also rammed into the space between the outermost tube 16 and the bricks, terminating at the inner refractory face of the furnace, as shown in FIG. 1. Member 42 is secured as by welding to the outer and/or inner surfaces of side wall 24.

A flat metallic plate or flange, indicated at 46, is secured as by threaded bolts or the like over the outwardly facing end of the cylindrical member 42. The outermost tube 16 terminates at the inwardly facing surface of the plate 46 and is secured thereto as by welding. The refractory material 18 occupying the annular space between tubes 14 and 16, and encasing auxiliary pipes 20 and 22, also terminates at the inner face of plate 46.

The plate 46 is further provided with a circular orifice in the center thereof having the same diameter as the outside diameter of tube 14, through which tubes 14 and 12 project. Tube 14 is secured as by welding to the outwardly facing surface of plate 46.

Means are provided for supplying an oxygen-bearing gas to the tube 12, for supplying a shroud gas to the annular space between tubes 12 and 14, and for supplying a cooling gas to the auxiliary cooling pipes 20 and 22. Such means are shown diagrammatically in FIG. 1, wherein a conduit 48 communicates with a supply of oxygen-bearing gas under pressure (not shown) for delivery thereof to tube 12. Conduits 50 and 52 communicate with a supply of cooling gas and shroud gas under pressure (not shown) for delivery thereof, respectively to the annular space between tubes 12 and 14 and to auxiliary pipe 20. It will of course be understood that a similar conduit is provided for auxiliary pipe 22.

In an exemplary installation, the innermost tube 12 was a 1½ inch schedule 40 steel pipe while the tube 14 was a 2 inch schedule 40 steel pipe. Gas flow rates varied between 30,000 and 80,000 SCFH through tube 12 and between 10,000 and 15,000 SCFH natural gas through the annular space between tubes 12 and 14.

Tube 16 was a 6 inch diameter steel pipe, and the refractory material 18 occupying the space between tubes 14 and 16 was a rammed aluminum-oxide containing refractory material.

Auxiliary cooling pipes 20 and 22 were ½ inch diameter steel pipe positioned about intermediate the distance between the outer surface of tube 14 and the inner surface of tube 16.

Cylindrical cast steel member 42 had an 8 inch inside diameter and a 12 inch outside diameter, thus providing a 1 inch annular space around tube 16 filled with rammed aluminum-oxide containing refractory material 44, which also occupied the space between tube 16 and bricks 26, forming an annular refractory seal at the inner surface of the bricks.

During the first portion of oxygen refining, the natural gas flow rate to the annular space between tubes 12 and 14 was maintained at 3.5% to 15% by volume of the oxygen flow rate, and the natural gas pressure was maintained between 3 and 75 psig. The flow of auxiliary cooling gas, also natural gas, to the pair of pipes 20, 22, was miantained between about 3.5% and 35% by volume (combined flow of pipes 20 and 22) of the oxygen flow rate, the gas pressure again being between 3 and 75 psig.

During the latter or blocking portion of the heat, when the carbon content had been reduced to approximately the desired final level, nitrogen or argon was used as the cooling gas, and a ratio of one part by volume oxygen to two parts by volume nitrogen was found to be satisfactory in keeping the lances from freezing up with solidified steel. However, it was discovered during further experimental trials that the oxygen could be shut off entirely for periods of time up to about 15 minutes without freezing up of the lance tip, due to the lower cooling capacity of nitrogen.

Heats produced over a period of time slightly exceeding one year before installation of the lance structure of the present invention averaged 10% to 12% rejection due to missed composition. Operation subsequent to installation of the lance structure of the present invention resulted in an average of only 5% to 6% of heats diverted due to missed composition.

The lance structure of the present invention has been found to last twice as long as a conventional lance structure using only an inner pipe for oxygen flow and a concentric outer pipe for flow of shroud gas through the annular space between the two pipes. Moreover, erosion or wear of the refractory lining of the furnace was reduced by 20%.

Expressed in another way, the reduction in lance consumption and refractory lining erosion reduced repair delay time between heats by about 11 minutes per heat, thus increasing production.

It will be noted that the tubes 12, 14 and 16 and auxiliary cooling pipes 20 and 22 terminate in a substantially common plane adjacent the inner face of the refractory lining 26. Operation in the manner described above was found to result in the formation of a shroud or shield of cooling gas issuing from the discharge of the annular space between tubes 12 and 14 surrounding the stream of oxygen-containing gas issuing from tube 12. On the other hand, cooling gas streams issuing from the discharges of pipes 20 and 22, at the 3 o'clock and 9 o'clock positions, did not become a part of the oxygen-shroud gas reaction, but rather bubbled upwardly along the hot face of the lining 26 forming a protective gas layer between the bath and lining at least in the area immediately adjacent the top of the lance, which was the area of most severe erosion.

The positioning of the auxiliary cooling pipes 20 and 22, on opposite sides of the second tube 14 and centered on the horizontal diameter of the three tubes 12, 14 and 16 (i.e., in the 3 o'clock and 9 o'clock positions), has been found to be critical. Other locations of the auxiliary cooling pipes were tested (e.g. 2 o'clock and 10 o'clock, and 4 o'clock and 8 o'clock positions), and it was determined that the refractory material immediately above the submerged end of the lance structure was best protected when the auxiliary cooling pipes were in the 3 o'clock and 9 o'clock positions.

The auxiliary cooling gas pipes are so designed and the connections thereto so arranged that in the event of cooling gas pressure failure, and consequent blockage by solidification of steel therein, the pipes may be freed by rodding or by burning with the lance in situ during normal operating intervals.

What we claim is:

1. A lance construction for supplying pressurized fluids beneath the surface of molten metal in a refractory lined refining vessel, said refractory lining being subject to erosion as successive heats of refined metal are produced, said lance construction comprising three concentric tubes extending through a side wall of said vessel and terminating in a common discharge plane beneath said molten metal surface adjacent said lining; means for supplying an oxygen-bearing gas to the innermost one of said tubes; an annular space between said innermost tube and the second of said tubes; means for supplying a shroud gas to said annular space; another annular space between said second tube and the outermost tube; a refractory material in said other annular space between said second tube and said outermost tube; a pair of parallel auxiliary cooling pipes encased in said refractory material and terminating in said common discharge plane, said pipes being disposed on opposite sides of said second tube and being centered on the horizontal diameter of said three tubes; and means for supplying a cooling gas to said auxiliary pipes, said pipes being positioned a distance sufficiently remote from said second tube that cooling gas supplied to said pipes does not intermix with said oxygen-bearing gas at the discharge end of said lance.

2. The lance claimed in claim 1 including means securing said tubes in a downwardly inclined opening in said side wall and refractory lining of said vessel, the opening in said side wall being above said surface of said molten metal.

3. The lance claimed in claim 2, wherein said means securing said tubes comprise an open-ended cylindrical cast steel member havng an inside diameter greater than the outside diameter of said outermost tube and concentric therewith, said cylindrical member terminating at its one end outside the side wall of said vessel and terminating at its other end within said refractory lining; rammed refractory material in an annular space between said cylindrical member and said outermost tube; a metallic plate secured over said one end of said cylindrical member, said outermost tube terminating at said plate and being secured thereto; and an orifice in said plate through which said second and innermost tubes extend to communicate with said means for supplying a shroud gas and said means for supplying an oxygen-bearing gas respectively.

4. The lance claimed in claim 1, wherein said refractory material in said other annular space is a cast aluminum oxide-containing material.

5. The lance claimed in claim 1, wherein said tubes and said auxiliary pipes are fabricated from a material chosen from the group consisting of carbon steel, stainless steel, copper, alloys of copper, and refractory.

6. The lance claimed in claim 1, wherein said common discharge plane adjacent the inner surface of said refractory lining of said vessel causes said auxiliary cooling gas to bubble upwardly along said inner surface thereby forming a protective gas layer between said molten metal and said refractory lining in the region adjacent said lance.

7. A method for oxygen refining of molten steel in a refractory lined refining vessel, comprising the steps of introducing a stream of oxygen-bearing gas beneath the surface of said molten steel through a lance extending through said refractory lining and having a discharge adjacent the inner surface of said refractory lining, simultaneously introducing a stream of shroud gas through said lance in surrounding relation to said oxygen-bearing gas stream, simultaneously introducing two auxiliary streams of cooling gas on each side of said oxygen-bearing gas stream at a distance sufficiently remote therefrom that said auxiliary gas streams do not surround said oxygen-bearing gas stream but bubble upwardly along said inner surface of said refractory lining, whereby to minimize consumption of said lance and erosion of said refractory lining.

8. The method claimed in claim 7, wherein said cooling gas stream introduced in surrounding relation to said oxygen-bearing gas stream is introduced at a flow rate of about 3.5% to about 15% by volume of the flow rate of said oxygen-bearing gas and at a pressure of about 3 to about 75 psig.

9. The method claimed in claim 7, wherein said auxiliary cooling gas streams are introduced at a flow rate of about 3.5% to about 35% by volume of the flow rate of said oxygen-bearing gas and at a pressure of about 3 to about 75 psig.

10. The method claimed in claim 7, wherein said shroud gas and said auxiliary cooling gas are chosen from the group consisting of hydrocarbons having 1 to 4 carbon atoms, nitrogen, argon and mixtures thereof.

11. The method claimed in claim 9, wherein said streams of auxiliary gas are introduced along a substantially horizontal plane.

12. The method claimed in claim 7, wherein a stream of said shroud gas comprising natural gas is introduced beneath the surface of said molten steel until a desired final carbon content of said steel is approached, and therafter a stream of said shroud gas comprising nitrogen is introduced at a a volume ratio of nitrogen:oxygen of at least 2:1.

* * * * *